(12) United States Patent
Farren et al.

(10) Patent No.: US 9,701,025 B2
(45) Date of Patent: Jul. 11, 2017

(54) PICK-UP TOOL WITH INTEGRATED LIGHT SOURCE

(71) Applicant: NIKE, Inc., Beaverton, OR (US)

(72) Inventors: John Matthew Farren, Taichung (TW); Dragan Jurkovic, Taichung (TW); Patrick Conall Regan, Taichung (TW); Howard Fu, Taichung (TW); Chih-Chi Chang, Douliu (TW); Kuo-Hung Lee, Douliu (TW); Chang-Chu Liao, Douliu (TW); Harsha Prahlad, Cupertino, CA (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/377,736

(22) Filed: Dec. 13, 2016

(65) Prior Publication Data

US 2017/0087729 A1   Mar. 30, 2017

Related U.S. Application Data

(63) Continuation of application No. 14/137,298, filed on Dec. 20, 2013, now Pat. No. 9,523,570.

(51) Int. Cl.
*B25J 15/06* (2006.01)
*B25J 15/00* (2006.01)
(Continued)

(52) U.S. Cl.
CPC ......... *B25J 15/0085* (2013.01); *A43D 119/00* (2013.01); *B25J 15/0616* (2013.01);
(Continued)

(58) Field of Classification Search
CPC .............. G01B 11/2433; B25J 15/0085; B25J 15/0616; B25J 19/023; B25J 19/027; B25J 15/008
(Continued)

(56) References Cited

U.S. PATENT DOCUMENTS 5,033,783 A * 7/1991 Izumi ................... B25J 15/0616
                                                      29/743
5,290,081 A * 3/1994 Ogura ................ H05K 13/0413
                                                      29/743
(Continued)

FOREIGN PATENT DOCUMENTS

JP            2004207644 A  *  7/2004

*Primary Examiner* — Gabriela Puig
(74) *Attorney, Agent, or Firm* — Shook, Hardy & Bacon L.L.P.

(57) ABSTRACT

Acquisition or pick-up tools that themselves aid in improving the ease with which images of an acquired substrate may be captured, and methods of operating such pick-up tools, are provided. The pick-up tools may include a pick-up surface adapted to interface with a foreign substrate and a light source integrated with the pick-up tool such that light emitted from the light source passes through the pick-up surface to the foreign substrate when the foreign substrate is temporarily coupled with the pick-up surface to create a silhouette of the foreign substrate. A vision system may be adapted for capturing the silhouette of the foreign substrate when the foreign substrate is temporarily coupled with the pick-up surface. The substrate pick-up surface may be formed of one of a transparent, a semi-transparent, or a translucent material such that light may at least partially pass there through.

16 Claims, 12 Drawing Sheets

(51) Int. Cl.
   *G01B 11/24* (2006.01)
   *B25J 19/02* (2006.01)
   *A43D 119/00* (2006.01)

(52) U.S. Cl.
   CPC .......... *B25J 19/023* (2013.01); *B25J 19/027* (2013.01); *G01B 11/2433* (2013.01); *A43D 2200/10* (2013.01)

(58) Field of Classification Search
   USPC ........... 294/185, 212, 213, 183, 188; 901/47
   See application file for complete search history.

(56) References Cited

U.S. PATENT DOCUMENTS

| | | | | |
|---|---|---|---|---|
| 5,422,554 A * | 6/1995 | Rohde | ................. | B25J 15/0616 29/429 |
| 5,724,722 A * | 3/1998 | Hashimoto | ........ | H01R 13/7137 29/721 |
| 5,743,001 A * | 4/1998 | Baker | ................. | H05K 13/0408 29/721 |
| 5,878,484 A * | 3/1999 | Araya | ................. | H05K 13/0413 29/721 |
| 6,380,537 B1 * | 4/2002 | Suhara | ............... | H05K 13/0413 250/208.1 |
| 6,435,808 B1 * | 8/2002 | Araya | ................ | H05K 13/0413 294/185 |
| 2002/0036411 A1 * | 3/2002 | Quick | ................ | H05K 13/0408 294/185 |
| 2011/0193362 A1 * | 8/2011 | Prahlad | ................ | B25J 15/0085 294/81.2 |
| 2013/0010398 A1 * | 1/2013 | Prahlad | ................. | H02N 13/00 361/234 |
| 2013/0127193 A1 * | 5/2013 | Regan | ................. | B25J 15/0691 294/188 |
| 2013/0249228 A1 * | 9/2013 | Lai | ........................ | H01L 21/681 294/185 |

\* cited by examiner

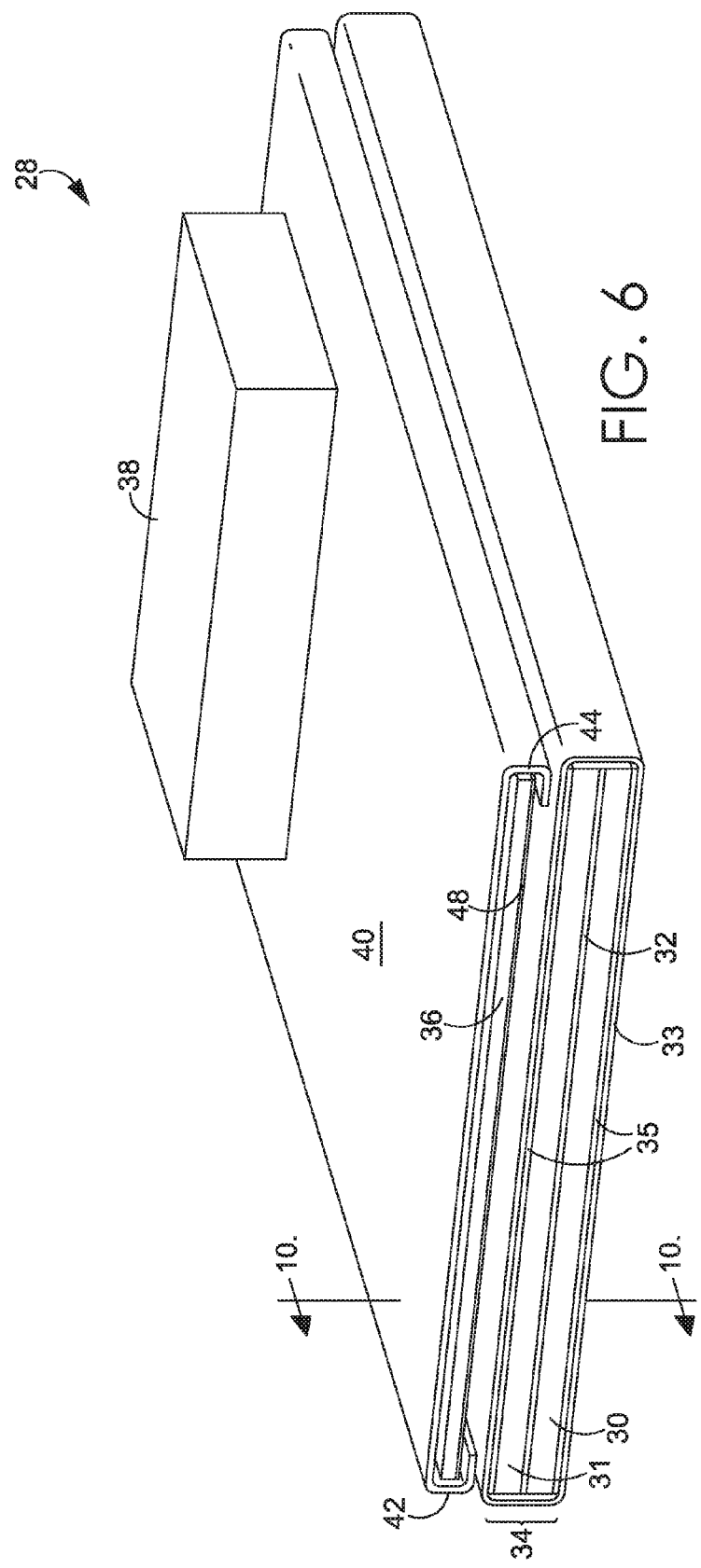

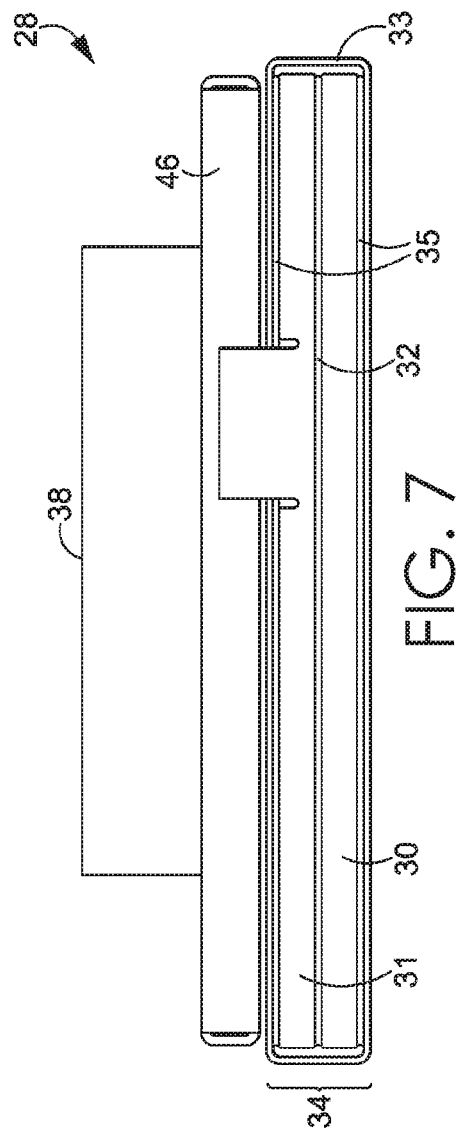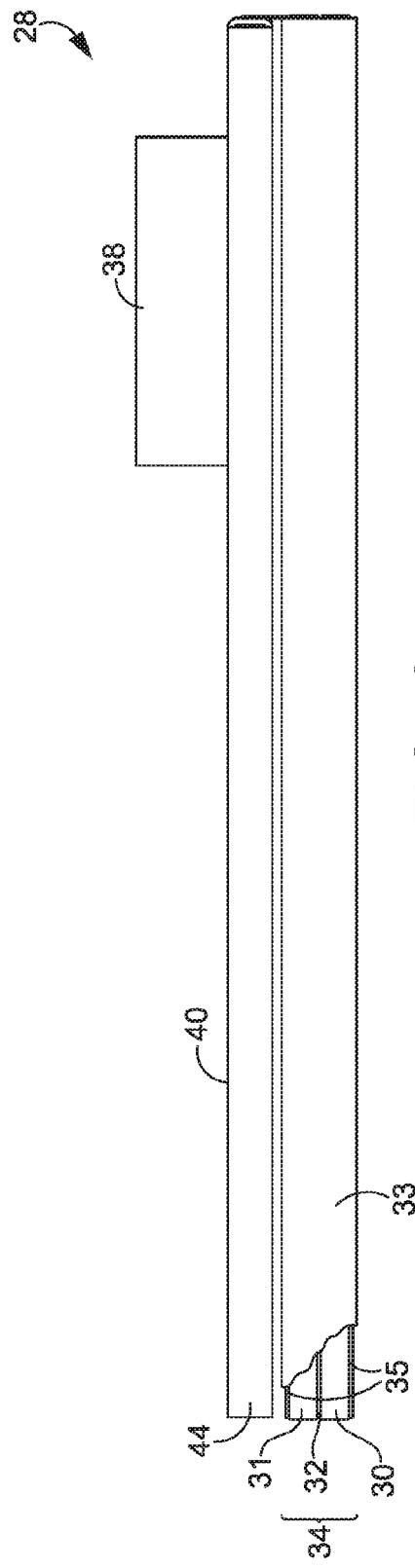

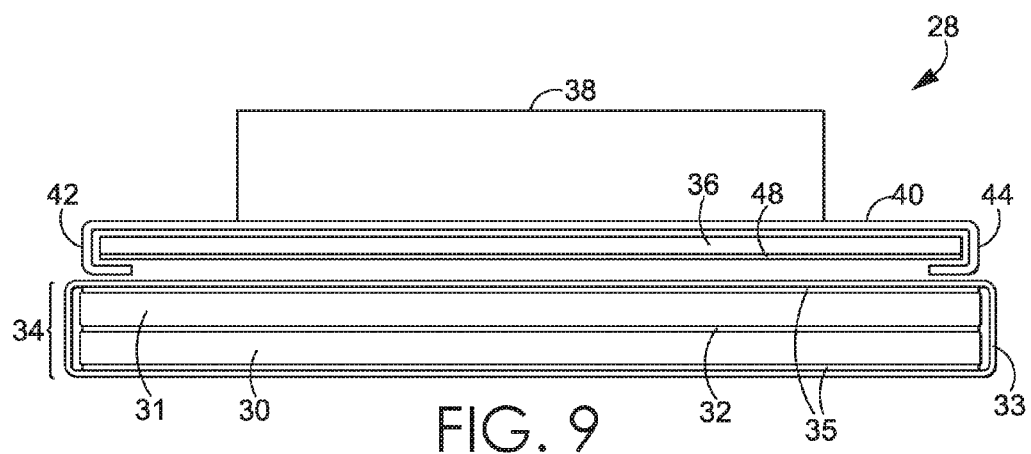
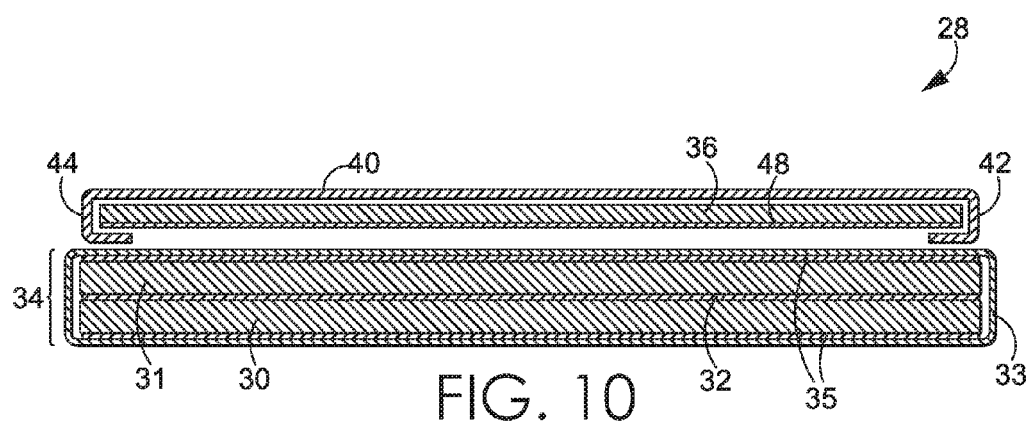

PICK-UP TOOL WITH INTEGRATED LIGHT SOURCE

CROSS-REFERENCE TO RELATED APPLICATIONS

This application is a continuation of, and claims priority to, pending U.S. Nonprovisional application Ser. No. 14/137,298, filed Dec. 20, 2013, titled "Pick-Up Tool With Integrated Light Source," the entire contents of which are hereby incorporated by reference.

STATEMENT REGARDING FEDERALLY SPONSORED RESEARCH OR DEVELOPMENT

Not applicable.

TECHNICAL FIELD

The present invention relates to automated manufacturing. More particularly, the present invention relates to, in an automated manner, picking up substrates, for instance, shoe parts that form all or part of a shoe assembly, and creating silhouettes thereof for use in image capture.

BACKGROUND

Manufacturing of articles, for instance, articles of footwear, typically requires a number of assembly steps, such as cutting, forming, and/or assembling several parts together. Many articles are comprised of a plurality of distinctly cut and formed portions precisely assembled in such a way as to result in a functional and/or aesthetically pleasing product article. Some methods of assembly, such as those that rely heavily on manual execution, may be resource intensive and may have a high rate of variability which may lead to a non-functional and/or non-aesthetically pleasing assembled product.

SUMMARY

This Summary provides a high-level overview of the disclosure and of various aspects of the invention and introduces a selection of concepts that are further described in the Detailed Description below. This Summary is not intended to identify key features or essential features of the claimed subject matter, nor is it intended to be used as an aid in isolation to determine the scope of the claimed subject matter.

In brief and at a high level, this disclosure describes, among other things, the acquisition of a foreign substrate, for instance, a portion of a shoe assembly, utilizing an acquisition or pick-up tool that itself aids in improving the ease with which images of the acquired substrate may be captured. For example, individual shoe parts (or any other desirable foreign substrate) may be acquired utilizing an acquisition or pick-up tool having a pick-up surface (e.g., a substantially planar surface of a plate or foam layer that may or may not be insulated) that is adapted to interface with the individual shoe parts and that includes a light source integrated therewith. Upon the pick-up surface of the pick-up tool interfacing with an individual shoe part and application of an appropriate force (e.g., an electro-adhesive force or a vacuum force), the individual shoe part may be acquired (or "picked up") by the pick-up tool. The pick-up tool may move such that the pick-up surface having the acquired shoe part is disposed between the light source that is integrated with the pick-up tool and a vision system adapted to capture images of the acquired shoe part. Activation of the light source may create a silhouette of the shoe part relative to the pick-up surface and the silhouette may be captured by the vision system. The silhouetted image may then be utilized to, for instance, determine location, size, shape, position, orientation, and/or other identifying information about the acquired shoe part that may be useful in further processing and assembly involving the shoe part.

It will be understood and appreciated by those of ordinary skill in the art that articles of footwear and/or parts collectively comprising articles of footwear are merely one example of foreign substrates that may be utilized with substrate pick-up tools in accordance with aspects hereof. Articles of footwear and assembly thereof are described herein merely for ease of description and such is not intended to limit the present invention in any way. Many other foreign substrates may be utilized with the tools described within the scope hereof.

An exemplary system that captures silhouettes of foreign substrates in accordance with aspects of the invention may be comprised of various components. In one exemplary aspect, the system includes a substrate pick-up tool and a vision system, the substrate pickup tool being movable relative to the vision system. The substrate pick-up tool may include a plate assembly having a substantially planar pick-up surface adapted to be temporarily coupled with a foreign substrate (e.g., a shoe part), the plate assembly being one of transparent, semi-transparent, or translucent such that light may at least partially pass there through. The substrate pick-up tool may further include an integrated light source adapted such that light emitted from the light source passes through the plate assembly to the foreign substrate when the foreign substrate is temporarily coupled with the pick-up surface of the plate assembly to create a silhouette of the foreign substrate relative to the pick-up surface. The vision system may be adapted for capturing the silhouette of the foreign substrate when the foreign substrate is temporarily coupled with the pick-up surface of the plate assembly.

An exemplary substrate acquisition or pick-up tool in accordance with aspects of the invention may be comprised of a pick-up surface and a light source. The pick-up surface may be adapted to interface with a foreign substrate (e.g., a shoe part) and may be one of transparent, semi-transparent, or translucent such that light may at least partially pass there through. The light source may be movable in conjunction with the pick-up surface relative to a vision system and may be adapted such that light emitted from the light source passes through the pick-up surface to the foreign substrate to create a silhouette of the foreign substrate relative to the pick-up surface to be captured by the vision system.

An exemplary substrate acquisition or pick-up tool that is movable with respect to a vision system for capturing one or more images in accordance with aspects of the invention may be comprised of a plate assembly, a light source and a light diffuser. The plate assembly may be adapted to interface with a foreign substrate (e.g., a shoe part) and may be fabricated such that light is permitted to pass there through to the foreign substrate. The light source may be integrated with the substrate acquisition or pick-up tool and may be adapted such that light emitted there from passes through the plate assembly to the foreign substrate to create a silhouette of the foreign substrate relative to the pick-up surface to be captured by the vision system. The light diffuser may be positioned between the plate assembly and the light source and may be adapted for scattering the light emitted by the light source.

BRIEF DESCRIPTION OF THE DRAWINGS

FIG. 6 is a schematic diagram of a perspective view of an exemplary acquisition or pick-up tool having a light source integrated therewith, a foam layer, and an optional insulating film, in accordance with aspects of the present invention;

FIG. 7 is a schematic diagram of a back view of the exemplary pick-up tool of FIG. 6, in accordance with aspects of the present invention;

FIG. 8 is a schematic diagram of a side view of the exemplary pick-up tool of FIG. 6, in accordance with aspects of the present invention;

FIG. 9 is a schematic diagram of a front view of the exemplary pick-up tool of FIG. 6, in accordance with aspects of the present invention;

FIG. 10 is a schematic diagram of a cross-sectional view of the exemplary pick-up tool of FIG. 6, the cross-section taken at line 10-10 of FIG. 6 in the direction of the arrows, in accordance with aspects of the present invention;

DETAILED DESCRIPTION

Figure 1:
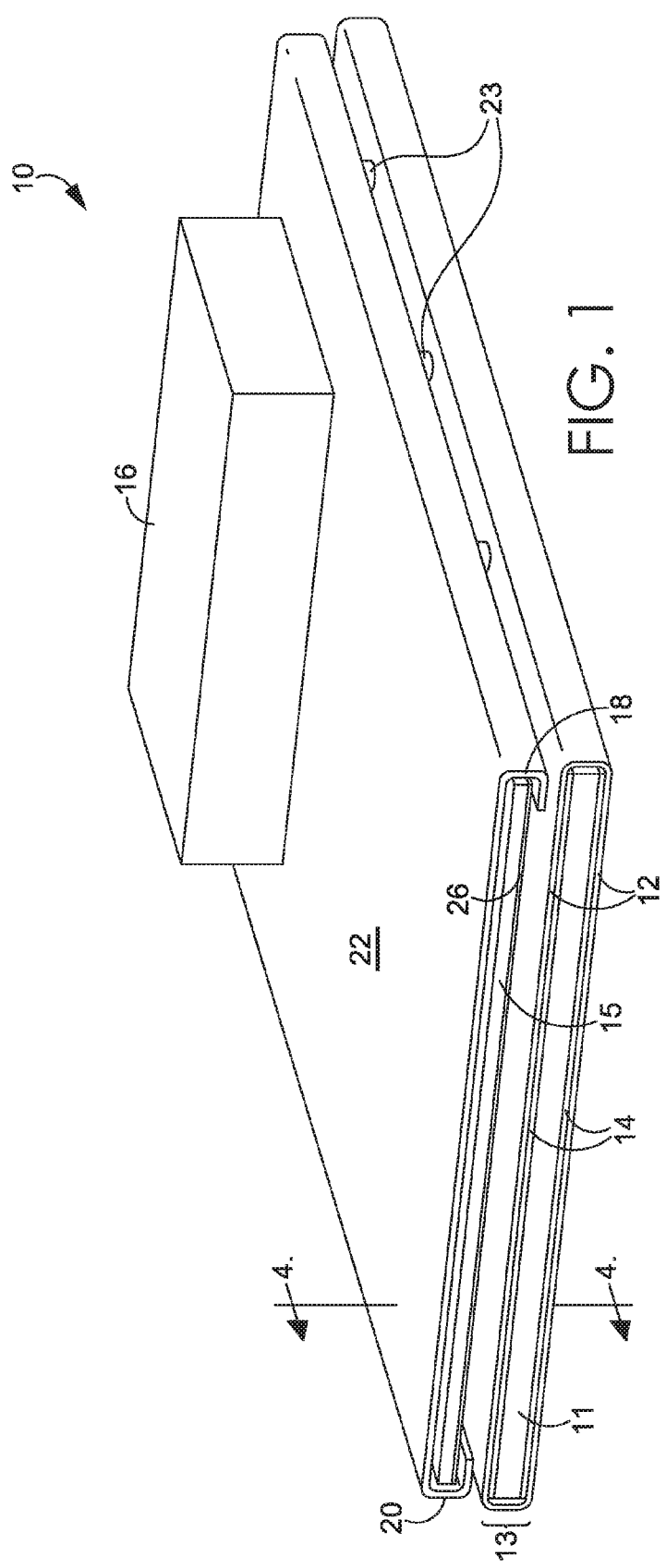
FIG. 1 is a schematic diagram of a perspective view of an exemplary acquisition or pick-up tool for use with electro-adhesive forces having a light source integrated therewith and including an optional insulating film, in accordance with aspects of the present invention.

The subject matter of certain aspects of the present invention is described with specificity herein to meet statutory requirements. But the description itself is not intended to define what is regarded as an invention, which is what the claims do. The claimed subject matter may comprise different elements or combinations of elements similar to the ones described in this document, in conjunction with other present or future technologies. Terms should not be interpreted as implying any particular order among or between various elements herein disclosed unless explicitly stated.

Subject matter described herein relates to pick-up tools for acquiring or picking up foreign substrates, the substrate pick-up tools having a light source integrated therewith for creating silhouettes of the foreign substrates for capture by a vision system. By way of example only, substrate pick-up tools, and systems incorporating substrate pick-up tools as described herein, may be utilized in the automated assembly of shoe parts. FIGS. 1-5 illustrate various views of an exemplary substrate acquisition or pick-up tool 10 for use with electro-adhesive forces, the substrate pick-up tool having an incorporated light source and including an optional insulating layer, in accordance with aspects of the present invention. With initial reference to FIG. 1, the pick-up tool 10 includes a plate 11 having a substantially planar pick-up surface (not visible in the illustrated view) adapted to interface with a foreign substrate, as more fully described below (see, e.g., FIG. 19). In the illustrated aspect, the plate 11 is at least partially covered by an insulating film 12 adapted to reduce or eliminate electrical arcing between electrodes disposed on a surface of the plate 11, e.g., when the voltage is sufficiently high. It will be understood by those of ordinary skill in the art, however, that the plate 11 may be present in pick-up tools in accordance with aspects herein without the insulating film 12. The extent to which the plate 11 is covered by the insulating film 12 depends, at least in part, upon the placement of electrodes (not shown in FIGS. 1-5) on one or more surfaces of the plate 11. Electro-adhesive surfaces comprising various configurations of electrodes are more fully described below with reference to FIGS. 12-15. In aspects, the insulating film 12 is coupled with the plate 11 utilizing a coupling agent 14, e.g., a bonding agent such as Very High Bond (VHB) tape that resists moisture and temperature conditions without substantially losing its adhesive properties. The plate 11 and the insulating film 12 collectively comprise an insulated plate assembly 13.

Each of the plate 11, the insulating film 12, and the coupling agent 14 may be fabricated of a transparent material, a semi-transparent material, a translucent material, or any other material that permits at least the partial passage of light there through. As the term is used herein, a transparent material is a material that permits light to pass through such that objects may be distinctly seen. As the term is used herein, a semi-transparent material is a material that is partially or imperfectly transparent. As the term is used herein, a translucent material is a material that partially permits light to pass through but causes sufficient diffusion to hinder perception of distinct images. The plate 11, the insulating film 12, and the coupling agent 14 each may be comprised of any of these types of materials, any combinations thereof, or any other materials so long as light is at least partially permitted to pass there through, the light passing through being sufficient to generate a silhouette of a foreign substrate temporarily adhered to the pick-up surface of the insulated plate assembly 13.

The pick-up tool 10 further includes an integrated light source 15 and a power supply mechanism 16. The pick-up tool 10 is adapted to be positioned with respect to a foreign substrate such that, upon activation of the pick-up tool 10, the foreign substrate may be temporarily adhered to the pick-up surface of the insulated plate assembly 13 (best seen in FIG. 19, more fully described below) and the light source 15 may be activated to create a silhouette of the foreign substrate, the silhouette being capable of being captured by a vision system. A silhouette as used herein is an outline and shape of a foreign substrate as enhanced by a contrast between the substrate and a lighter background, such as the insulated plate assembly 13, when illuminated by the light source 15. The contrast between a foreign substrate and the insulated plate assembly 13 as perceived by a vision system may be enhanced by the application of a back light that illuminates the insulated plate assembly 13 while not significantly illuminating the vision-system-facing surface of the foreign substrate. As such, when the light source 15 is illuminated, the contrast created between the foreign substrate and the pick-up surface of insulated plate assembly 13 may cause the vision system to perceive and capture fewer details of the vision system-facing surface of the foreign substrate relative to if the light source 15 was not illuminated. While fewer surface details of the foreign substrate may be captured when the light source 15 is illuminated, the position and shape of the foreign substrate as exposed by the increased contrast may be enhanced and more accurately and efficiently used by a vision system, in an exemplary aspect.

Figure 2:
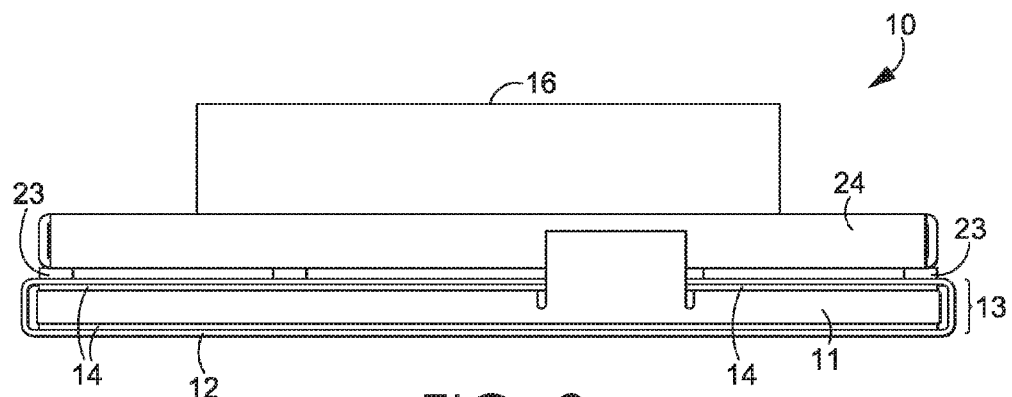
FIG. 2 is a schematic diagram of a back view of the exemplary pick-up tool of FIG. 1, in accordance with aspects of the present invention.

The light source 15 illustrated in FIG. 1 is disposed between the insulated plate assembly 13 and the power supply mechanism 16. The light source 15 may be a Light-Emitting Diode (LED) light source, a fluorescent light source, an incandescent light source, or any other light-producing component. The light produced may be a visible spectrum light, an Ultra Violet (UV) light, an InfraRed (IR) light, or any other light spectrum from any source suitable for use with the pick-up tool 10 for creating silhouettes of foreign substrates temporarily adhered to the pick-up surface of the insulated plate assembly 13 as captured by a vision system. As illustrated, the light source 15 is substantially rectangular in shape and adapted to be disposed within a channel created by first and second protruding side edges 18, 20 of a top plate assembly 22 of the pick-up tool 10, the first and second protruding side edges 18, 20 extending to at least partially contain a bottom surface of the light source 15, in an exemplary aspect. The light source 15 may further be contained by a protruding back edge 24 of the top plate assembly 22, as best seen in FIG. 2 which illustrates a back view of the pick-up tool of FIG. 1. The top plate assembly 22 and the insulated plate assembly 13 may be coupled with one another by any suitable coupling mechanism, e.g., screws 23 that may or may not extend through the entirety of the insulated plate assembly 13. It will be understood by those of ordinary skill in the art that the substantially rectangular configuration of the light source 15 is exemplary and not meant to limit the scope of aspects hereof in any way. Any suitable size, shape, and configuration for the light source 15 may be utilized within the scope hereof so long as the light source 15 is suitable to create a silhouette of a foreign substrate temporarily coupled with a pick-up surface of the insulated plate assembly 13 upon activation thereof. Further, it is contemplated that the light source 15 may be maintained or otherwise secured in communication with the top plate assembly 22 by other means. For example, it is contemplated that mechanical fasteners, bonding agents, structural configurations, or other coupling mechanisms may be used to maintain the light source 15 in communication with one or more portions of the pick-up tool 10. Because the light source 15 is effectively maintained with the insulated plate assembly 13 by way of the top plate assembly 22, the light source 15 moves with the insulated plate assembly 13. Therefore, a relatively constant contrast may be maintained between the insulated plate assembly 13 and a foreign substance regardless of the position and movement of the pick-up tool 10 in general.

Figure 11A:
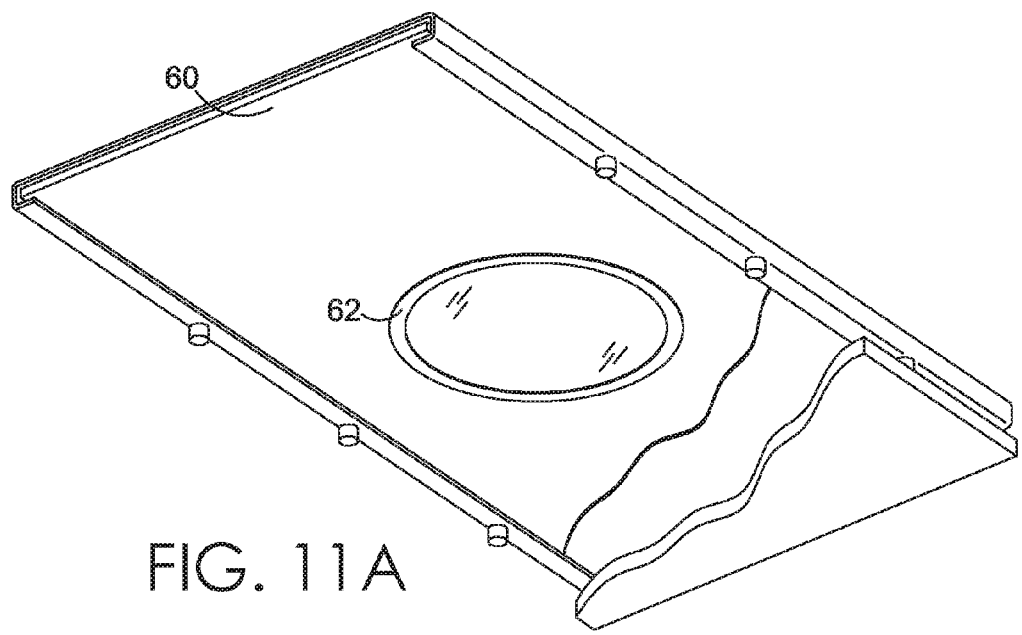
FIG. 11A is a schematic diagram of an exemplary light source that may be incorporated into a pick-up tool as described herein, the light source having a central light-generating region, in accordance with aspects of the present invention.
Figure 11B:
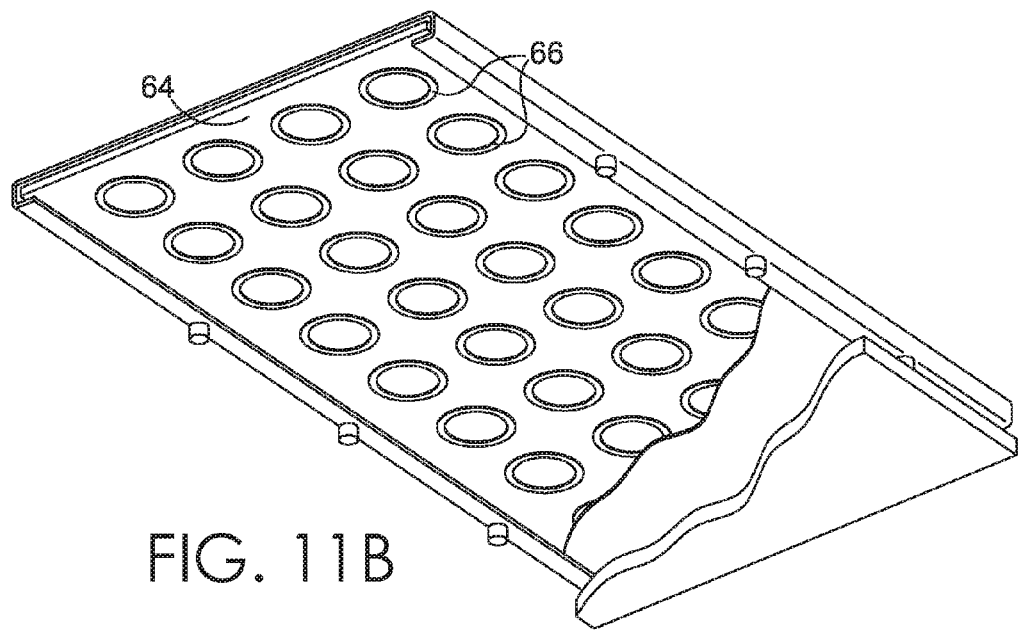
FIG. 11B is a schematic diagram of another exemplary light source that may be incorporated into a pick-up tool as described herein, the light source having a plurality of light-generating regions, in accordance with aspects of the present invention.

The light source 15 may include a single light-generating region (e.g., a single light bulb) or a plurality of light-generating regions. Additionally, different regions of the light source may produce light of different colors. For instance, one region of the light source 15 may produce red light while another region of the same light source may produce green light and yet another region may produce yellow light. In another aspect, a single region of the light source 15 may produce a plurality of different colors of light. An exemplary light source 60 having a single, centrally located light-generating region 62 is illustrated in FIG. 11A. An exemplary light source 64 having a plurality of light-generating regions 66 arranged in a strip-like pattern is illustrated in FIG. 11B. It will be understood by those of ordinary skill in the art that the light sources 60 and 64 of FIGS. 11A and 11B, respectively, are merely exemplary and are not meant to limit the scope of aspects hereof. Any suitable number, configuration and shape of light-generating regions may be utilized within the scope hereof so long as the light source 15 is suitable to create a silhouette of a foreign substrate temporarily adhered to an outer surface of the insulated plate assembly 13 upon activation thereof. In aspects, the light source 15 may be removable from the pick-up tool 10. Further, in aspects, different regions of the light source 15 may be activated or powered up and deactivated or powered down independently of other regions of the light source 15.

Figure 3:
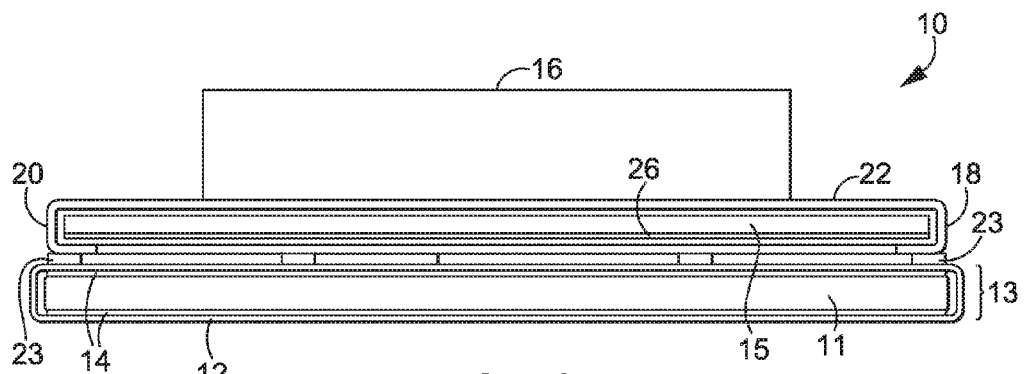
FIG. 3 is a schematic diagram of a front view of the exemplary pick-up tool of FIG. 1, in accordance with aspects of the present invention.

FIG. 3 illustrates a front view of the exemplary pick-up tool 10 of FIG. 1. The top plate assembly 22 of the pick-up tool 10, including the first and second protruding side edges 18, 20, is illustrated extending to at least partially contain the light source 15, as described above with respect to FIG. 1. The insulated plate assembly 13 and power supply mechanism 16 (more fully described below) are also illustrated.

Figure 4:
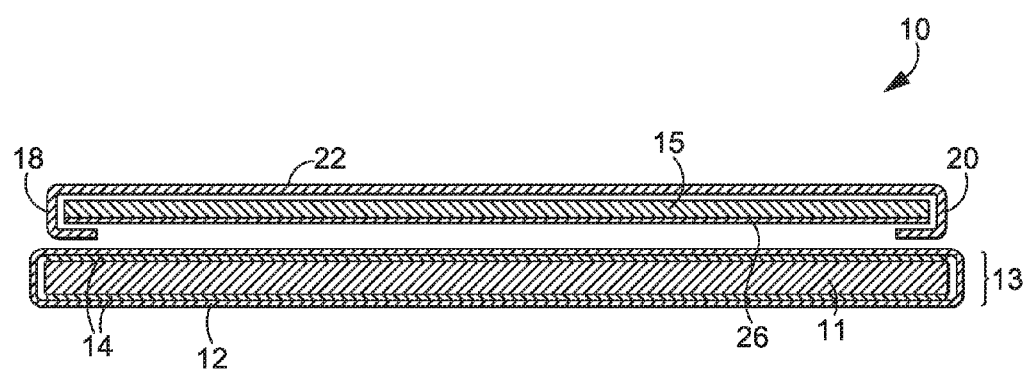
FIG. 4 is a schematic diagram of a cross-sectional view of the exemplary pick-up tool of FIG. 1, the cross-section taken at line 4-4 of FIG. 1 in the direction of the arrows, in accordance with aspects of the present invention.

In aspects, the light source 15 may include a light diffuser 26 adapted for scattering or spreading out light emitted by the light source 15. This is best seen in FIG. 4 which is a cross-sectional view of the pick-up tool 10 of FIG. 1, the cross-section taken at line 4-4 of FIG. 1. The light diffuser 26 may be integrated with the light source 15 itself, may be a separate component from the light source 15 that is adapted to be positioned between the light source 15 and the insulated plate assembly 13, or may be a combination thereof. It will be understood that aspects hereof may include or not include a light diffuser 26 as desired. The light diffuser 26 may be implemented in an exemplary aspect to diffuse the light generated by individual light generating regions (e.g., the light generating regions 62 and 66 of FIGS. 11A and 11B, respectively) of the light source 15 to more evenly distribute the generated light across an area. It is contemplated that by diffusing the light and more evenly distributing the light, that a more consistent contrast may be achieved between the insulated plate assembly 13 and a foreign substrate. Without the diffuser 26 or a comparable portion, a level of contrast perceived between the foreign substrate and the light source 15 may vary depending on the location of individual light generating regions within the light source 15. Stated differently, diffusing light reduces the perception of illumination "hot spots" or variations in intensity of the light, which may provide a more consistent silhouette formed by the pick-up tool 10, in an exemplary aspect.

Figure 5:
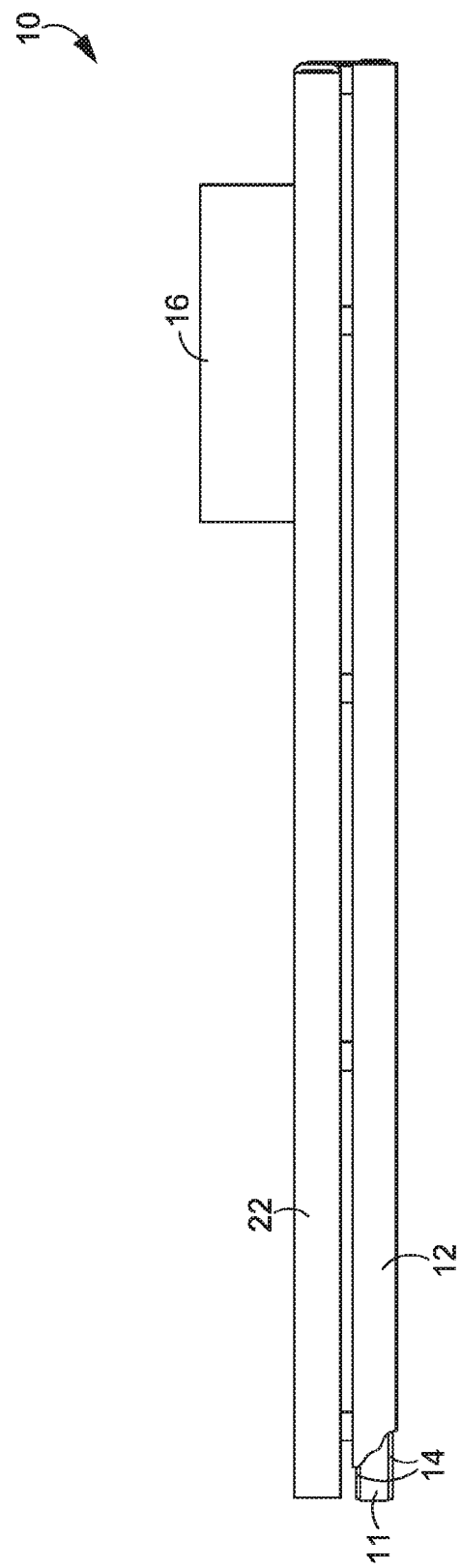
FIG. 5 is a schematic diagram of a side view of the exemplary pick-up tool of FIG. 1, in accordance with aspects of the present invention.

FIG. 5 illustrates a side view of the exemplary pick-up tool 10 of FIG. 1. The top plate assembly 22 of the pick-up tool 10 that at least partially contains the light source (not visible in the illustrated view) is shown. The power supply mechanism 16 is also shown disposed on the top plate assembly 22 of the pick-up tool 10. In the aspect illustrated in FIGS. 1-5, the power supply mechanism 16 may be adapted to supply adequate power to the pick-up tool 10 for activation of the light source 15 and/or activation of the force or forces utilized to acquire or pick-up a foreign substrate, e.g. electro-adhesive forces, as more fully described below. It will be understood by those of ordinary skill in the art that a power supply mechanism adapted for activating the force or forces utilized to acquire or pick-up a foreign substrate may be the same or different from a power supply mechanism adapted for activating the light source 15. The illustrated single power supply mechanism 16 is merely exemplary and its singular nature and/or placement relative to the other parts comprising the pick-up tool 10 are not intended to limit the scope hereof in any way.

FIGS. 6-10 illustrate various views of another exemplary substrate acquisition or pick-up tool 28 similar to the substrate pick-up tool 10 of FIGS. 1-5 but additionally including a foam layer 30. As with the substrate pick-up tool 10, and with initial reference to FIG. 6, the substrate pick-up tool 28 includes a plate 31, an integrated light source 36, and a power supply mechanism 38. The plate 31 includes a substantially planar surface with which a foam layer 30 is coupled, for instance, utilizing a coupling agent 32 such as VHB tape, or the like. In aspects, the foam layer 30 is adapted to at least partially conform to the shape and/or contours of a foreign substrate being acquired or picked-up so as to aid in the temporary adherence of the foreign substrate and the pick-up tool 28.

The coupled plate 31 and foam layer 30 are at least partially covered by an insulating film 33 adapted to reduce or eliminate electrical arcing between electrodes disposed on the foam layer 30, e.g., when the voltage is sufficiently high. It will be understood by those of ordinary skill in the art that the plate 31 and foam layer 30 may be present in pick-up tools in accordance with aspects hereof without the insulating film 33, for instance, when voltage and other parameters may be appropriately adjusted. The extent to which the coupled plate 31 and foam layer 30 are covered by the insulating film 33 depends, at least in part, upon the placement of electrodes (not shown in FIGS. 6-10) with respect to the foam layer 30. Electro-adhesive surfaces comprising various configurations of electrodes are more fully described below with reference to FIGS. 12-15. In aspects, the insulating film 33 is coupled with the foam layer 30 and/or the plate 31 utilizing a coupling agent 35, a bonding agent such as Very High Bond (VHB) tape that resists moisture and temperature conditions without substantially losing its adhesive properties. The plate 31, the foam layer 30, and the insulating film 33 collectively comprise an insulated plate assembly 34.

Figure 16:
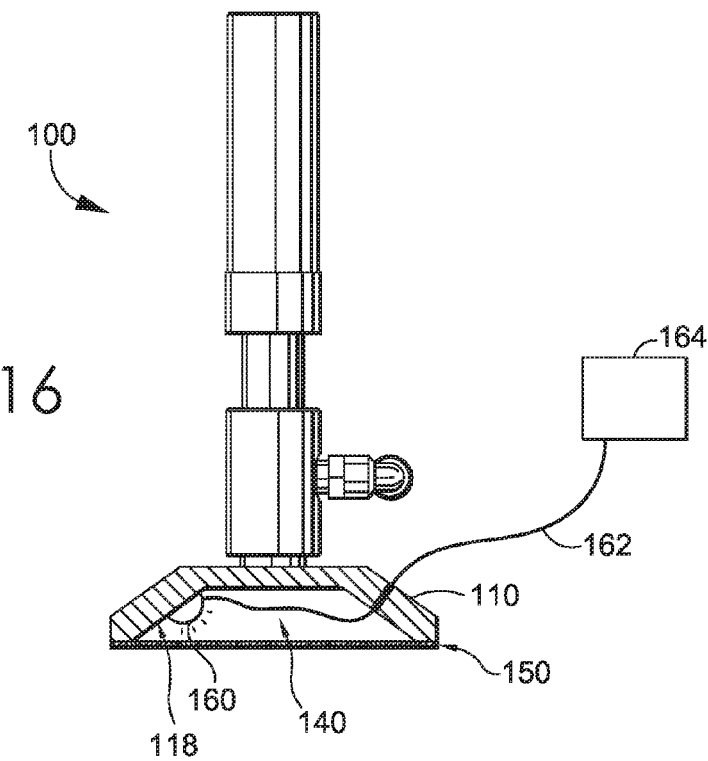
FIG. 16 is a schematic diagram of a cut-view of an exemplary vacuum-enabled pick-up tool, in accordance with aspects of the present invention.

The substrate pick-up tool 28 is adapted to be positioned with respect to a foreign substrate such that, upon activation of the substrate pick-up tool 28, the foreign substrate may be temporarily coupled with the pick-up surface of the insulated plate assembly 34 (best seen in FIG. 16, more fully described below). Each of the plate 31, the foam layer 30, the coupling agent 32, the insulating film 33 and the coupling agent 35 may be fabricated of a transparent material, a semi-transparent material, a translucent material, or any other material that permits at least the partial passage of light there through. The plate 31, the foam layer 30, the coupling agent 32, the insulating film 33 and the coupling agent 35 each may be comprised of any material, or any combination of materials, so long as light is at least partially permitted to pass there through, the light passing through being sufficient to generate a silhouette of a foreign substrate temporarily adhered to a pick-up surface of the insulated plate assembly 34.

The light source 36 of the pick-up tool 28 of FIGS. 6-10 is disposed between the insulated plate assembly 34 and a top plate assembly 40. The light source 36 may be a Light-Emitting Diode (LED) light source, a fluorescent light source, an incandescent light source, or any other light-producing component. The light produced may be a visible spectrum light, an Ultra Violet (UV) light, an InfraRed (IR) light, or any other light spectrum from any source suitable for use with the pick-up tool 28 for creating silhouettes of foreign substrates temporarily adhered to the pick-up surface of the tool 28 as captured by a vision system. As illustrated, the light source 36 is substantially rectangular in shape and adapted to be disposed within a channel created by first and second protruding side edges 42, 44 of a top plate assembly 40 of the pick-up tool 28, the first and second protruding side edges 42, 44 extending to at least partially contain a bottom surface of the light source 36, in an exemplary aspect. The light source 36 may further be contained by a protruding back edge 46 of the top plate assembly 40, as best seen in FIG. 7 which illustrates a back view of the pick-up tool of FIG. 6. The top plate assembly 40 and the insulated plate assembly 34 may be coupled with one another by any suitable coupling mechanism, e.g., screws (not shown) that may or may not extend through the entirety of the insulated plate assembly 34. Any suitable size, shape, and configuration for the light source 36 may be utilized within the scope hereof so long as the light source 36 is suitable to create a silhouette of a foreign substrate temporarily adhered to a pick-up surface of the insulated plate assembly 34 upon activation thereof. Additionally, the light source 36 may include any number of light-generating regions in a variety of configurations (e.g., the single-light-generating-region configuration of FIG. 11A and the multiple-light-generating-region configuration of FIG. 11B) within the scope hereof.

FIG. 8 illustrates a side view of the exemplary pick-up tool of FIG. 6. The top plate assembly 40 of the pick-up tool 28 that at least partially contains the light source (not visible in the illustrated view) is shown. In the aspect illustrated in FIGS. 6-10, the power supply mechanism 38 is disposed on the top plate assembly 40 of the pick-up tool 28. The power supply mechanism 38 may be adapted to supply adequate power to the pick-up tool 28 for activation of the light source 36 and activation of the force or forces utilized to acquire or pick-up a foreign substrate, e.g., electro-adhesive forces, as more fully described below. It will be understood by those of ordinary skill in the art that a power supply mechanism adapted for activating the force or forces utilized to acquire or pick-up a foreign substrate may be the same or different from a power supply mechanism adapted for activating the light source 36. The illustrated single power supply mechanism 38 is merely exemplary and its singular nature and/or placement relative to the other parts comprising the pick-up tool 28 are not intended to limit the scope hereof in any way.

FIG. 9 illustrates a front view of the exemplary pick-up tool 28 of FIG. 6. The top plate assembly 40 of the pick-up tool 28, including the first and second protruding side edges 42, 44 are illustrated extending to at least partially contain the light source 36, as described above with respect to FIG. 6. The insulated plate assembly 34 and power supply mechanism 38 are also illustrated.

In aspects, a pick-up tool 28 as illustrated in FIGS. 6-10 may include a light diffuser 48 adapted for scattering or spreading out light emitted by the light source 36. This is best seen in the cross-sectional view of FIG. 10, the cross-section being taken at line 10-10 of FIG. 6. The light diffuser 48 may be integrated with the light source 36 itself, may be a separate component from the light source 36 that is adapted to be positioned between the light source 36 and the pick-up surface of the insulated plate assembly 34, or may be a combination thereof. It will be understood that aspects hereof may include or not include a light diffuser 48 as desired. For example, it is contemplated that the foam layer 30 and the plate 31, in an exemplary aspect, are formed from sufficiently transparent/translucent/semi-transparent materials to allow sufficient transmission of light from the light source 36 through the insulated plate assembly 34. The foam layer 30, in this example, may effectively diffuse the light energy to achieve the results contemplated herein of a diffuser. Therefore, it is contemplated that because the foam layer 30 serves as a diffuser in an exemplary aspect, a separate diffuser, such as light diffuser 48 may be omitted.

As previously set forth, the pick-up tools 10 and 28 illustrated in FIGS. 1-5 and 6-10, respectively, may be adapted to be utilized with electro-adhesive forces for acquiring or picking up foreign substrates. Substrate pick-up tools adapted to clamp, hold, and move or otherwise handle a wide variety of foreign substrates and utilizing electro-adhesive forces generally use compliant materials to clamp to foreign substrates. One exemplary electro-adhesive pick-up tool or system is described in U.S. Patent Publication No. 2013/0010398 which is entitled MATERIALS FOR ELECTROADHESION AND ELECTROLAMINATES, which publication is hereby incorporated by reference as if set forth herein in its entirety.

As the term is used herein, "electro-adhesion" refers to the mechanical coupling of two objects using electrostatic forces. Electro-adhesion as described herein uses electrical control of these electrostatic forces to permit temporary and detachable attachment between a foreign substrate and a pick-up surface of an electro-adhesion-enabled pick-up tool (e.g., the pick-up surface of the pick-up tools 10 and 28 of FIGS. 1-5 and 6-10, respectively). This electrostatic adhesion holds the foreign substrate and the pick-up surface together or increases the traction or friction between the foreign substrate and the surface of the insulated plate assembly due to electrostatic forces created by an applied electric field. The pick-up surface of the pick-up tool is placed against or nearby a surface of a foreign substrate. An electrostatic adhesion voltage is then applied via electrodes using external control electronics in electrical communication with the electrodes. The electrostatic adhesion voltage uses alternating positive and negative charges on neighboring electrodes. As a result of the voltage difference between electrodes, one or more electro-adhesive forces are generated, which electro-adhesive forces act to hold the pick-up surface of the tool and the foreign substrate against one another. Due to the nature of the forces being applied, it will be readily appreciated that actual contact between the pick-up surface and the foreign substrate is not necessary. For example, a piece of paper, thin film, or other material or substrate may be placed between the pick-up surface of the tool and the foreign substrate. The electrostatic force maintains the current position of the pick-up surface of the tool relative to the surface of the foreign substrate. The overall electrostatic force may be sufficient to overcome the gravitational pull on the foreign substrate, such that the pick-up tool may be used to hold the foreign substrate aloft.

Removal of the electrostatic adhesion voltages from the electrodes ceases the electrostatic adhesion force between the pick-up surface of the plate and the surface of the foreign substrate. Thus, when there is no electrostatic adhesion voltage between electrodes, the pick-up tool can move readily relative to the surface of the foreign substrate. This condition allows the pick-up tool to move before and after an electrostatic adhesion voltage is applied. Well controlled electrical activation and de-activation enables fast adhesion and detachment, such as response times less than about 50 milliseconds, for example, while consuming relatively small amounts of power.

In an exemplary aspect, the pick-up surface of the pick-up tool includes electrodes on an outside surface of an insulating material. This aspect is well suited for controlled attachment to insulating and weakly conductive inner materials of various foreign substrates. As will be readily appreciated, a shorter distance between the surface of the pick-up surface and the surface of a foreign substrate results in a stronger electro-adhesive force between the objects. Accordingly, a deformable surface adapted to at least partially conform to the surface of the foreign substrate may be used.

As the term is used herein, an electrostatic adhesion voltage refers to a voltage that produces a suitable electrostatic force to couple the pick-up surface of the tool to a foreign substrate. The minimum voltage needed for the pick-up surface will vary with a number of factors, such as: the size of the pick-up surface, the material conductivity and spacing of electrodes, the insulating material, the foreign substrate material, the presence of any disturbances to electro-adhesion such as dust, other particulates or moisture, the weight of any substrates being supported by the electro-adhesive force, compliance of the electro-adhesive device, the dielectric and resistivity properties of the foreign substrate, and the relevant gaps between electrodes and the foreign substrate surface.

In some aspects, an electro-adhesive pick-up surface can take the form of a substantially planar panel or sheet having a plurality of electrodes thereon. In other aspects, the electro-adhesive pick-up surface may take a fixed shape that is matched to the geometry of the foreign substrate most commonly lifted or handled by the pick-up tool. The electrodes may be enhanced by various means, such as by being patterned on an adhesive device surface to improve electro-adhesive performance, or by making them using soft or flexible materials to increase compliance and thus conformance to irregular surfaces on foreign substrates.

Figure 12:
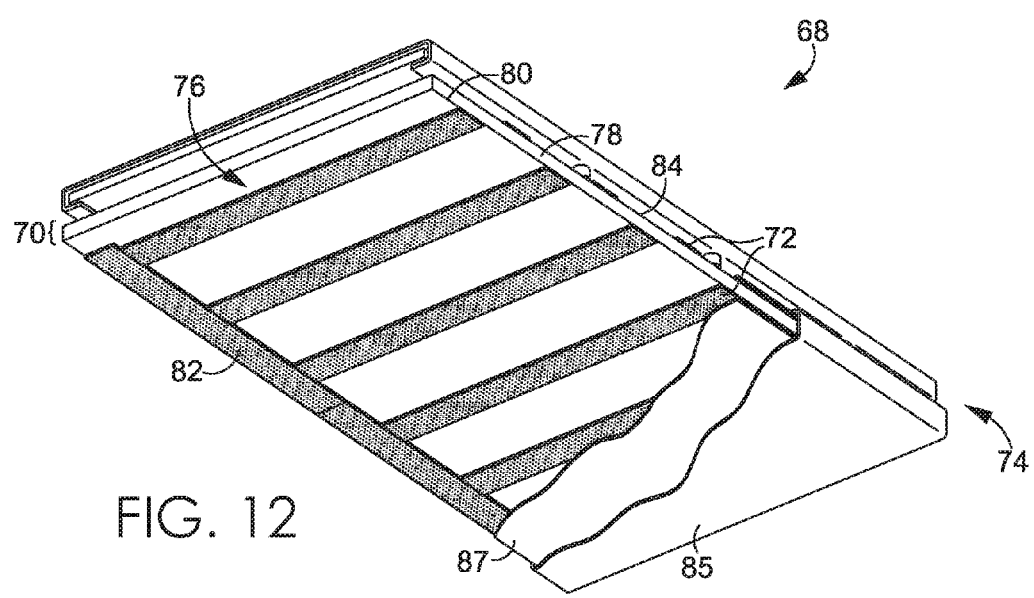
FIG. 12 is a schematic diagram of a bottom perspective view of an exemplary pick-up tool having an electro-adhesion-enabled pick-up surface and including an optional insulating film layer, in accordance with aspects of the present invention.
Figure 13:
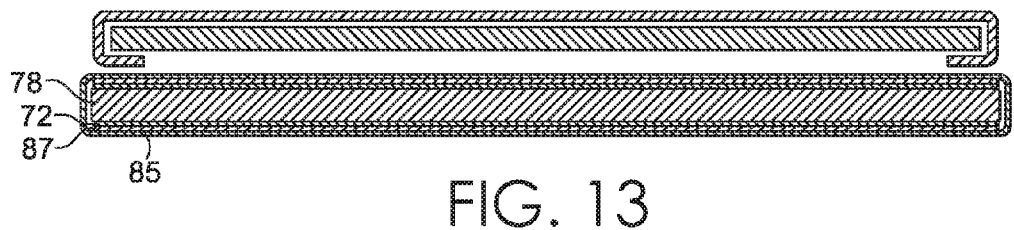
FIG. 13 is a schematic diagram of a cross-sectional view of the exemplary pick-up tool of FIG. 12, in accordance with aspects of the present invention.

With reference to FIGS. 12-15, two examples of plate assemblies suitable for use with substrate pick-up tools hereof and having electro-adhesive pick-up surfaces in the form of substantially planar panels or sheets with electrodes patterned thereon are shown. FIGS. 12 and 13 illustrate a plate assembly 68 having a plate 70 in the form of a sheet or flat panel with electrodes 72 patterned on top and bottom surfaces thereof. Top and bottom electrode sets 74, 76 are disposed on opposite sides of an insulating layer 78. In some cases, the insulating layer 78 can be formed of a stiff or rigid material. In aspects, the electrodes 72 as well as the insulating layer 78 may be compliant and composed of a polymer such as an acrylic elastomer, to increase compliance. In aspects, the modulus of the polymer is below about 10 MPa. In aspects, the modulus of the polymer is more specifically below about 1 MPa.

The electrode set 76 is disposed on a top surface 80 of the insulating layer 78, and includes an array of linear patterned electrodes 72. A common electrode 82 electrically couples the electrodes 72 in the set 76 and permits electrical communication with all the electrodes 72 in the set 76 using a single input lead to the common electrode 82. The electrode set 74 is disposed on a bottom surface 84 of the insulating layer 78, and includes a second array of linear patterned electrodes 72 that is laterally displaced from the electrodes 72 on the top surface 80. The bottom electrode set 74 may also include a common electrode (not shown). The electrodes can be patterned on opposite sides of the insulating layer 78 to increase the ability of the electro-adhesive pick-up surface to withstand higher voltage differences without being limited by breakdown in the air gap between the electrodes, as will be readily appreciated by those of ordinary skill in the art.

The top surface 80 and the bottom surface 84 of the insulating layer 78 are covered by an optional insulating film 85 adapted to reduce or eliminate electrical arcing between the electrodes disposed thereon. As will be readily appreciated by those of ordinary skill in the art, electrical arcing can produce very high heats which can cause burning of materials comprising foreign substrates to be acquired. Thus, covering the electrodes with an insulating film 85 is desirable in some aspects hereof. In aspects, the insulating film 85 is coupled with the top and bottom surfaces 80, 84 of the insulating layer 78 utilizing a coupling agent 87, e.g., a VHB tape, or the like.

Figure 14:
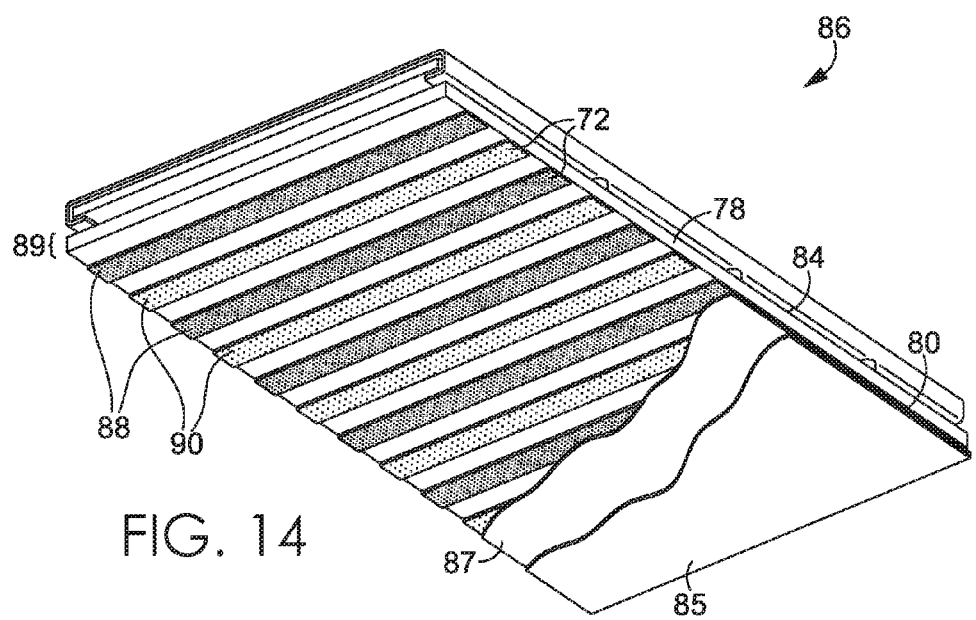
FIG. 14 is a schematic diagram of a bottom perspective view of another exemplary pick-up tool having an electro-adhesion-enabled pick-up surface and including an optional insulating film layer, in accordance with aspects of the present invention.
Figure 15:
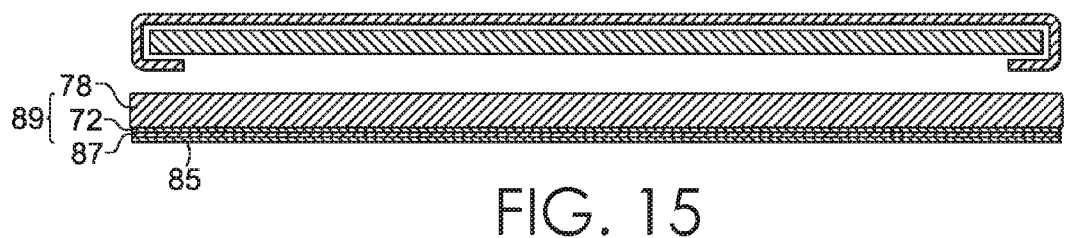
FIG. 15 is a schematic diagram of a cross-sectional view of the exemplary pick-up tool of FIG. 14, in accordance with aspects of the present invention.

Alternatively, electrodes also may be patterned on the same surface as the insulating layer, such as that which is shown in the plate assembly 86 of FIGS. 14 and 15. As shown, the plate 89 comprises a sheet or substantially planar panel with electrodes 72 patterned only on one surface thereof. The plate 89 can be substantially similar to the plate 70 of FIG. 12, except that electrode sets 88 and 90 are disposed on the same surface 80 of a compliant insulating layer 78. No electrodes are located on the bottom surface 84 of the insulating layer 78. This particular aspect decreases the distance between the positive electrodes 72 in the set 88 and the negative electrodes 72 in the set 90, and allows the placement of both sets of electrodes on the same surface of the plate 89. Functionally, this eliminates the spacing between the electrode sets 88 and 90 due to the insulating layer 78, as in the plate 70 illustrated in FIG. 12. It also eliminates the gap between one set of electrodes (previously on the bottom surface 84) and the foreign substrate surface when the top surface 80 adheres to a surface of a foreign substrate. Although plate 70 or 89 may be used, these changes in the latter-described plate 89 increase the electro-adhesive forces between the plate 89 and the subject foreign substrate to be handled.

In the aspect illustrated in FIGS. 14 and 15, only the top surface 80 of the insulating layer 78 is covered by an insulating film 85 adapted to reduce or eliminate electrical arcing between the electrodes. This is due to the fact that electrodes are disposed only on the top surface 80 thereof, reducing any benefit of covering the bottom surface 84 of the plate 89. It will be understood by those of ordinary skill in the art that the insulating film 85 shown in any of FIGS. 12-15 may cover only electrode-bearing surfaces or any additional surfaces (e.g., side surfaces and the like) as desired within the scope hereof. It further will be understood by those of ordinary skill in the art that pick-up tools in accordance with aspects hereof may be void of an insulating film 85, for instance, when voltage and other parameters are appropriately adjusted. Any and all such variations are contemplated to be within the scope of aspects hereof.

In some aspects, an electro-adhesive plate or pick-up surface may comprise a sheet or veil type grasper that is substantially flexible in nature. In such aspects, either no backing structure or a substantially flexible backing structure can be used, such that all or a portion of the veil type pick-up surface can substantially flex or otherwise conform to a foreign substrate, as may be desired for a given application. Creating electro-adhesive pick-up tools that facilitate such conforming or compliance to a foreign substrate can be achieved, for example, by forming the electro-adhesive layer or pick-up surface out of thin materials, by using foam or elastic materials, by butting out flaps or extensions from a primary electro-adhesive sheet, or by applying the sheet only to a few selected underlying locations, rather than to an entire rigid backing, among other possibilities.

Although the foregoing exemplary aspects for electro-adhesive pick-up surfaces in the form of substantially planar panels or sheets depict bars or stripes for electrodes, it will be understood that any suitable pattern for electrodes may also be used for such a sheet-type electro-adhesive pick-up surface. For example, a sheet-type electro-adhesive pick-up surface could have electrodes in the form of discrete squares or circles that are distributed about the sheet and polarized in an appropriate manner, such as in an evenly spaced "polka-dot" style pattern. Other examples such as two sets of electrodes patterned as offset spirals also may be used. As one particular example, where a thin and flexible material is used for the insulating layer, such as a polymer, and where electrodes are distributed there about in the form of discrete discs, a resulting flexible and compliant electro-adhesive pick-up surface "blanket" would be able to conform to the irregular surfaces of a relatively large object while providing numerous different and discrete electro-adhesive forces thereto during voltage application.

In addition to pick-up tools adapted to utilize electro-adhesive forces as described thus far, pick-up tools in accordance with aspects hereof may utilize vacuum forces for acquiring or picking up foreign substrates. An exemplary pick-up tool 100 adapted for use with vacuum forces is illustrated in cut-view in FIG. 16. FIG. 16 depicts, among other features, a vacuum distribution cavity 140 and a vacuum plate 150. A vacuum distributor 110 and the vacuum plate 150, in combination, define a volume of space forming the vacuum distribution cavity 140. The vacuum distribution cavity 140 is a volume of space that allows for the flow of gas to allow for an equalized dispersion of a vacuum force as more fully described in U.S. patent application Ser. No.

13/299,934 which is entitled MANUFACTURING VACUUM TOOL, and is incorporated in its entirety herein by reference. The exemplary pick-up tool 100 of FIG. 16 includes a light source 160 disposed on an interior wall 118 thereof. It will be understood that the light source 160 may be disposed on any one or more of the interior surfaces forming the vacuum distribution cavity 140 so long as the light source 160 is disposed within the vacuum distribution cavity 140. As with the integrated light sources 14 and 34, the light source 160 may be a Light-Emitting Diode (LED) light source, a fluorescent light source, an incandescent light source, or any other light-producing component. The light produced may be a visible spectrum light, an Ultra Violet (UV) light, an InfraRed (IR) light, or any other light spectrum from any source suitable for use with the pick-up tool 100 for creating silhouettes of foreign substrates temporarily adhered to the pick-up surface of the vacuum plate 150 as captured by a vision system. The light source 160 includes an electrical lead 162 coupled with a light mechanism 164 for activating the light source 160, as desired. It is contemplated that the electrical lead 162 may sealably pass through the vacuum distributor 110 such that electrical power may be transmitted to the light source 160 within the distribution cavity 140 without allowing a detrimental amount of gas to enter the distribution cavity 140 by way of the channel through which the electrical lead 162 passes.

Figure 17:
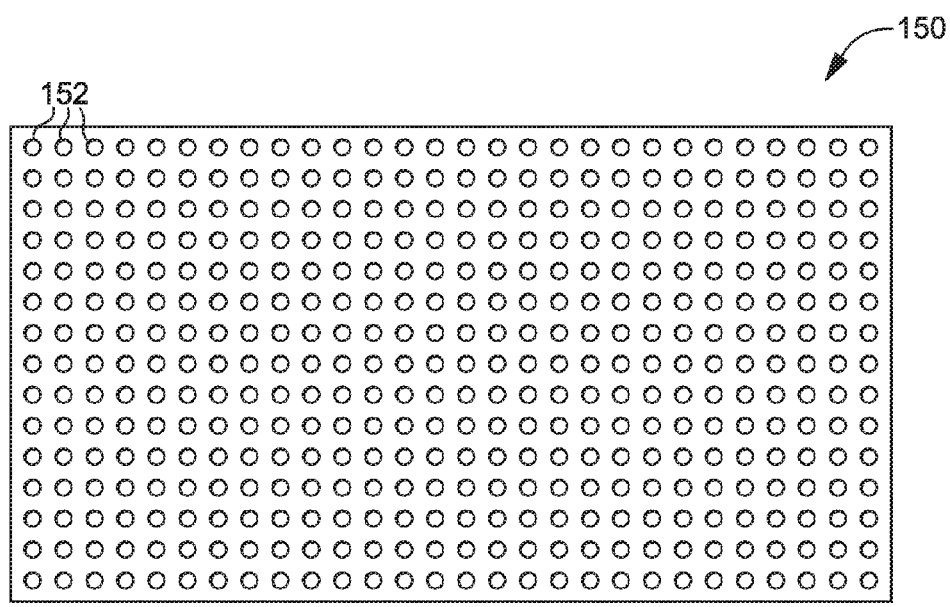
FIG. 17 is a schematic diagram of an exemplary pick-up surface that may be utilized with a vacuum-enabled pick-up tool, such as the pick-up tool of FIG. 16, in accordance with aspects of the present invention.

With reference to FIG. 17, an exemplary vacuum plate 150 includes one or more apertures 152 therein through which air flows inwardly to temporarily adhere a foreign substrate upon application of an appropriate vacuum force. The vacuum plate 150 may be constructed of a transparent material, a semi-transparent material, a translucent material, or any other material that permits at least the partial passage of light there through. As previously set forth with respect to plates 12 and 32, the vacuum plate 150 may be comprised of any material, or any combination of materials, so long as light is at least partially permitted to pass there through, the light passing through being sufficient to generate a silhouette of a foreign substrate temporarily adhered to a pick-up surface of the plate 150. It is contemplated that the plate 150 may effectively diffuse the light generated by a light source. Further, while not depicted, it is contemplated that another diffuser may also be positioned between a light source and the substrate-contacting surface of the plate 150. For example, the diffuser may be a gas permeable substance that is effective to diffuse light while not detrimentally affecting the transmission of gas/fluid from the substrate-contacting surface to the distribution cavity 140.

Figure 19:
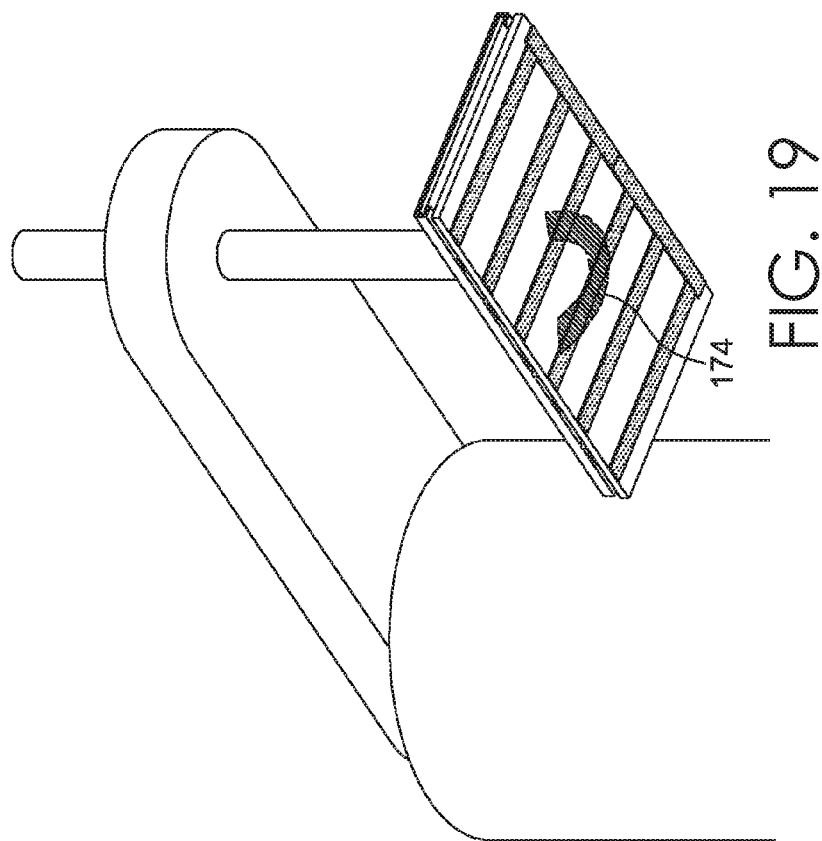
FIG. 19 is a schematic diagram illustrating a foreign substrate (e.g., a shoe part) silhouetted against a surface of an exemplary electro-adhesion-enabled pick-up tool, in accordance with aspects of the present invention.
Figure 18:
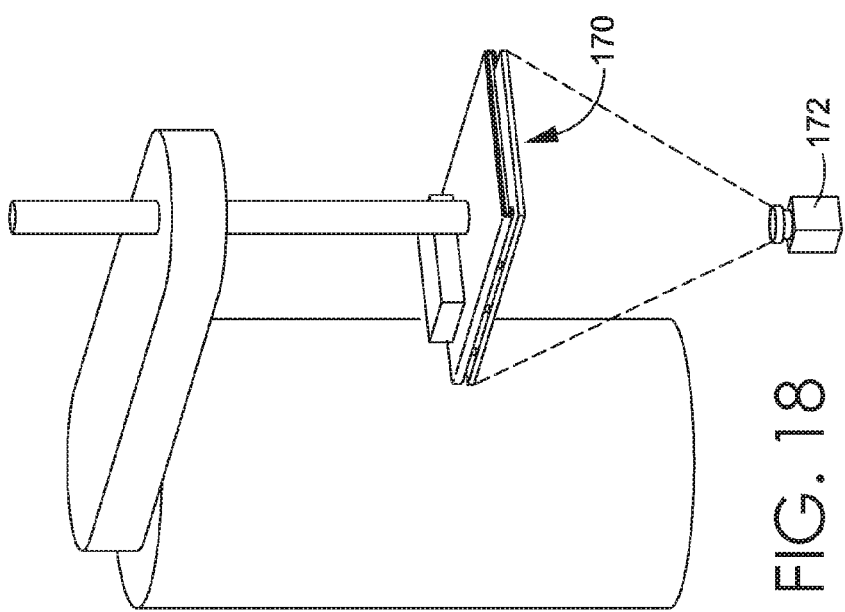
FIG. 18 is a schematic diagram of an exemplary system for capturing silhouettes of foreign substrates, in accordance with aspects of the present invention.

Referring now to FIG. 18, in operation, a pick-up force (e.g., an electro-adhesive or vacuum force) may be activated and a foreign substrate may be picked up by a pick-up tool 170, such as the substrate pick-up tools described herein. While temporarily adhered to a pick-up surface of the pick-up tool 170, the pick-up tool 170 may be positioned with respect to a vision system 172 such that an image of the pick-up surface with the temporarily-adhered foreign substrate may be captured. Upon activation of the light source integrated with the pick-up tool 172, a silhouette 174 of the foreign substrate against the pick-up tool may be created, as shown in FIG. 19. An image of the silhouette 174 may be captured by the vision system 172 for use in, for instance, determining location, size, shape, position, orientation, and the like of the acquired foreign substrate or portion thereof that may be useful in further processing and/or assembly. The vision system 172 may be comprised of a camera or other image sensing device, such as a charge-coupled device. Further, as discussed hereinafter, it is contemplated that the vision system may be operatively coupled with a computing device effective for controlling one or more portions (e.g., the vision system 172, the movement of the pick-up tool 170 by robotic means, illumination characteristics of a light source of the pick-up tool 170, and activation of a pick-up force), in an exemplary aspect. The computing device may also be effective for capturing and storing one or more images/representations of the foreign substrate as a silhouette against the plate surface of the pick-up tool 170.

Figure 20:
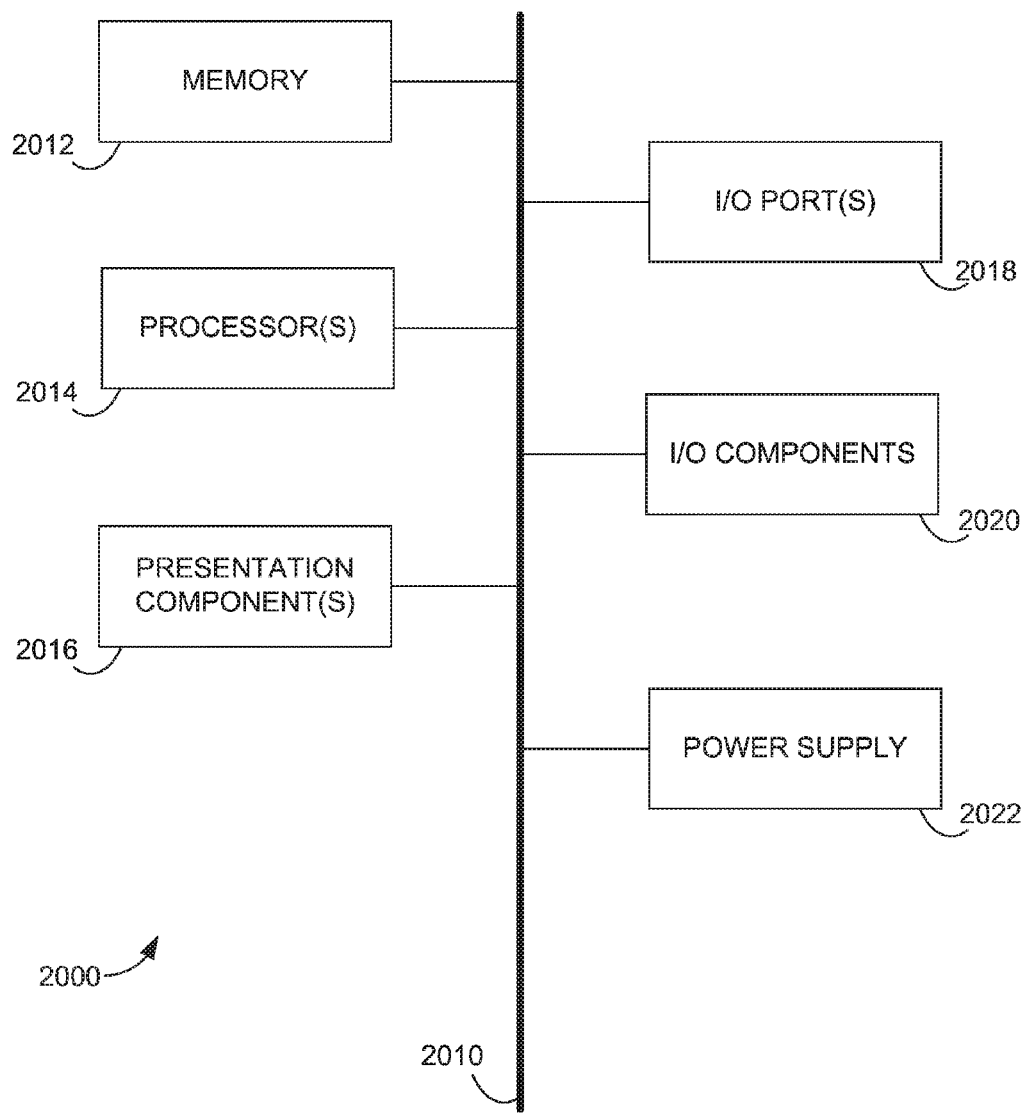
FIG. 20 is a block diagram illustrating an exemplary computing device that may be used with systems and methods in accordance with aspects of the present invention.

The technology herein described may comprise, among other things, a pick-up tool, a system, a method or a set of instructions stored on one or more computer-readable media. Information stored on the computer-readable media may be used to direct operations of a computing device, and an exemplary computing device 2000 is depicted in FIG. 20. The computing device 2000 is but one example of a suitable computing system and is not intended to suggest any limitation as to the scope of use or functionality of inventive aspects hereof. Neither should the computing system 2000 be interpreted as having any dependency or requirement relating to any one or combination of components illustrated. Moreover, aspects of the invention may also be practiced in distributed computing systems where tasks are performed by separate or remote-processing devices that are linked through a communications network.

The computing device 2000 has a bus 2010 that directly or indirectly couples the following components: memory 2012 (which may include memory chips or other local memory structures), one or more processors 2014 (which may include a programmable logic controller), one or more presentation components 2016, input/output (I/O) ports 2018, I/O components 2020, and an illustrative power supply 2022. The bus 2010 represents what may be one or more busses (such as an address bus, data bus, or combination thereof). Although the various blocks of FIG. 20 are shown with lines for the sake of clarity, in reality, delineating various components is not so clear, and metaphorically, the lines would more accurately be grey and fuzzy. For example, processors may have memory. Further, it will be understood by those of ordinary skill in the art that not all computing devices contemplated for use with aspects hereof may utilize all components illustrated.

The computing device 2000 typically includes a variety of computer-readable media. Computer-readable media can be any available media that can be accessed by the computing system 2000 and includes both volatile and nonvolatile media, removable and non-removable media. By way of example, and not limitation, computer-readable media may comprise computer storage media and communication media; computer storage media excluding signals per se. Computer storage media includes volatile and nonvolatile, removable and non-removable media implemented in any method or technology for storage of information such as computer-readable instructions, data structures, program modules or other data.

Computer storage media includes, by way of example, and not limitation, Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communications media.

The computing device 2000 is depicted to have one or more processors 2014 that read data from various entities such as memory 2012 or I/O components 2020. Exemplary data that is read by a processor may be comprised of computer code or machine-usable instructions, which may be computer-executable instructions such as program modules, being executed by a computer or other machine. Generally, program modules such as routines, programs, objects, components, data structures, etc., refer to code that perform particular tasks or implement particular abstract data types.

The presentation components 2016 present data indications to a user or other device. Exemplary presentation components are a display device, speaker, printing component, light-emitting component, etc. The I/O ports 2018 allow the computing device 2000 to be logically coupled to other devices including the I/O components 2020, some of which may be built in.

In the context of automated manufacturing, a computing device 2000 may be used to determine operations of various manufacturing tools. For example, a computing device may be used to control a pick-up tool, for instance, the pick-up tools described herein.

Many different arrangements of the various components depicted, as well as components not shown, are possible without departing from the scope of the claims below. Exemplary aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated to be within the scope of the claims.

What is claimed is:

1. A method of operating a substrate pick-up tool, the method comprising:
    activating a pick-up force of a substrate pick-up tool;
    picking up a foreign substrate with the substrate pick-up tool;
    positioning the substrate pick-up tool within a field of view of a vision system while the foreign substrate is temporarily adhered to a pick-up surface of the substrate pickup tool; and
    with the vision system, capturing an image of the pick-up surface while the foreign substrate is temporarily adhered to the pick-up surface,
    wherein the pick-up surface is one of transparent, semi-transparent, or translucent, and
    wherein the substrate pick-up tool includes a light source movable in conjunction with the pick-up surface relative to the vision system, the light source adapted such that light emitted from the light source passes through the pick-up surface to the foreign substrate to create a silhouette of the foreign substrate to be captured by the vision system.

2. The method of claim 1, wherein the substrate pick-up tool is vacuum-enabled.

3. The method of claim 1, wherein the substrate pick-up tool is electro-adhesion-enabled.

4. The method of claim 3, wherein the pick-up surface comprises a foam layer, and wherein the foam layer is one of transparent, semi-transparent, or translucent.

5. The method of claim 1, wherein the substrate pick-up tool further comprises a light diffuser adapted for scattering the light emitted by the light source.

6. The method of claim 1, wherein the light source emits light in at least one spectrum selected from a visible light spectrum, an UltraViolet (UV) light spectrum, and an Infra-Red (IR) light spectrum.

7. The method of claim 1, wherein the light source is removable from the substrate pick-up tool.

8. The method of claim 1, wherein the vision system is comprised of a camera.

9. The method of claim 1, wherein the vision system is operatively coupled with a computing device configured to control one or more of the substrate pick-up tool, the light source, and the vision system.

10. One or more non-transitory computer-readable media having computer-executable instructions thereon that, when executed by one or more processors, cause the one or more processors to perform a method for operating a substrate pick-up tool that is movable with respect to a vision system for capturing one or more images, the method comprising:
    sending an indication to a controller of a substrate pick-up tool to maintain a current position of a plate assembly of the substrate pick-up tool relative to a surface of a foreign substrate, wherein the plate assembly is configured to permit light to pass therethrough to the foreign substrate,
    sending an indication to a controller of a light-source to emit light from the light-source, which passes through the plate assembly to the foreign substrate, the light-source being integrated with the substrate pick-up tool, wherein the light emitted by the light source is scattered with a light diffuser that is positioned between the plate assembly and the light source;
    positioning the substrate pick-up tool within a field of view of a vision system while maintaining the current position of the plate assembly relative to the surface of the foreign substrate; and
    capturing an image of a silhouette of the foreign substrate with the vision system.

11. The non-transitory computer readable media of claim 10, wherein the plate assembly is comprised of one or more transparent, semi-transparent, or translucent materials.

12. The non-transitory computer readable media of claim 10, wherein the plate assembly comprises a foam layer that is adapted such that light emitted from the light source at least partially passes there through.

13. The non-transitory computer readable media of claim 12, wherein the foam layer is comprised of one of a transparent, a semi-transparent, or a translucent foam material.

14. The non-transitory computer readable media of claim 10, wherein the light source emits light in at least one spectrum selected from a visible light spectrum, an UltraViolet (UV) light spectrum, and an InfraRed (IR) light spectrum.

15. The non-transitory computer readable media of claim 10, the method further comprising storing the captured image of the silhouette.

16. The non-transitory computer readable media of claim 15, the method further comprising, based at least on the captured image of the silhouette, determining at least one of a location, a size, a shape, a position, or an orientation of the foreign substrate relative to the plate assembly.

* * * * *